United States Patent [19]

Tazi et al.

[11] Patent Number: 5,008,355

[45] Date of Patent: Apr. 16, 1991

[54] SLURRY POLYMERIZATION OF MALEIC ANHYDRIDE AND ACRYLIC ACID IN A COSOLVENT SYSTEM OF ETHYL ACETATE AND CYCLOHEXANE

[75] Inventors: Mohammed Tazi, Wayne; Krystyna Plochocka, Scotch Plains, both of N.J.

[73] Assignee: GAF Chemicals Corporation, Wayne, N.J.

[21] Appl. No.: 501,059

[22] Filed: Mar. 29, 1990

[51] Int. Cl.$^5$ ............................................. C08F 34/02
[52] U.S. Cl. .................................................. 526/271
[58] Field of Search ........................................ 526/271

[56] References Cited

FOREIGN PATENT DOCUMENTS 3233775 11/1982 Fed. Rep. of Germany ...... 526/271
328725 2/1988 United Kingdom ................ 526/271

*Primary Examiner*—Joseph L. Schofer
*Assistant Examiner*—Alex H. Walker
*Attorney, Agent, or Firm*—Walter Katz; Marilyn J. Maue; Joshua J. Ward

[57] ABSTRACT

Slurry copolymerization of maleic anhydride with (meth)acrylic acid and, optionally, with $C_1$-$C_4$ alkyl vinyl ether in a cosolvent system of cyclohexane and ethyl acetate yields a pumpable slurry, from which uniform, fine, white powders having a predetermined weight average molecular weight of about 10,000 to one million, preferably about 30,000 to 400,000, are obtained.

10 Claims, No Drawings

SLURRY POLYMERIZATION OF MALEIC ANHYDRIDE AND ACRYLIC ACID IN A COSOLVENT SYSTEM OF ETHYL ACETATE AND CYCLOHEXANE

BACKGROUND OF THE INVENTION

1. Field of the Invention

This invention relates to slurry polymerization of maleic anhydride and (meth)acrylic acid and optionally, with a $C_1$–$C_4$ alkyl vinyl ether, and, more particularly, to a cosolvent system for such polymerization in which a pumpable slurry is formed, from which uniform, fine powders of such copolymers can be obtained within a predetermined molecular weight range and with substantially no residual maleic anhydride.

2. Description of the Prior Art

Copolymerization of maleic anhydride and acrylic acid by precipitation polymerization in a solvent is well known in the art. For example, Walinsky, in U.S. Pat. No. 4,390,670, describes the preparation of substantially homogeneous acrylate/maleate copolymers having a number average molecular weight of 500 to 5000 by copolymerizing 35 to 65 mole percent acrylic acid and 65 to 35 mole percent maleic anhydride in the presence of a polymerization initiator and a chain-transfer solvent selected from a ketone, ester or ether. The ketones disclosed were methyl isobutyl ketone, n-pentanone and n-hexanone; the esters were n-butyl acetate, diethyl phthalate and methyl benzoate; and the ethers were 1,2-diethoxyethane, 1,4-dioxane and diisopropyl ether. The especially preferred solvent was isobutyl ketone. Substitution of xylene or toluene for isobutyl ketone produced a rubbery mass which seriously impeded stirring and resulted in a non-homogeneous copolymer product.

Denzinger, in European Patent No. 103,254 B1, utilized a protective colloid in combination with an aromatic hydrocarbon or aliphatic halohydrocarbon solvent to prevent formation of such aggregates during copolymerization of maleic anhydride and acrylic acid.

Denzinger, in DE 3233775 A1, described a process for making copolymers of maleic anhydride and acrylic acid in a solvent selected from an aliphatic or cycloaliphatic hydrocarbon having from 5–12 carbon atoms. In this case a protective colloid also was used to avoid aggregation.

Wulfvon Bonin, in U.S. Pat. No. 4,390,672, indicated that copolymerization of acrylic acid and maleic anhydride in a solvent was difficult because the solvent tended to reduce the velocity of polymerization and the quantity of maleic anhydride built into the polymer. Accordingly, a solvent-free process was described using a melt of maleic anhydride and an enol ether as a polymerization regulator.

However, these and other processes have not been entirely successful in providing copolymers of maleic anhydride and acrylic acid as (1) a pumpable slurry of the copolymer in a non-toxic solvent; (2) without requiring an excessive degree of agitation; (3) from which predetermined high molecular weight copolymers can be readily obtained; (4) in the form of uniform, fine white powders; (5) having substantially no residual monomers; (6) in a process that does not require a protective colloid; and (7) wherein the solvent can be easily recycled.

Accordingly, an objective of the invention is to provide a process for making copolymers of maleic anhydride and acrylic acid, optionally with other comonomers, which can satisfy the desired features and conditions listed above.

These and other objects and features of the invention will be made apparent from the following description of the invention.

SUMMARY OF THE INVENTION

What is described herein is a slurry polymerization process for preparing a copolymer of maleic anhydride and acrylic acid or methacrylic acid, optionally including a $C_1$–$C_4$ alkyl vinyl ether, having a predetermined weight average molecular weight of about 10,000 to one million, preferably about 30,000 to 400,000.

The process comprises copolymerizing about 10 to 70 mole percent, preferably 20 to 60 percent, maleic anhydride, about 30 to 90 mole percent, preferably 40 to 80 percent, of acrylic acid (or methacrylic acid) and, optionally, from 0 to 25 mole percent of a $C_1$–$C_4$ alkyl vinyl ether, in the presence of a free radical initiator, at about 50° to 150° C., preferably about 60° to 80° C., in a cosolvent system comprising about 5 to 80 percent by weight, preferably 10 to 75 percent, of ethyl acetate and about 20 to 95 percent by weight, preferably 25 to 90 percent by weight, of an aliphatic or cycloaliphatic hydrocarbon having a boiling point of at least 10° C. above the reaction temperature. The preferred cosolvent is cyclohexane. In the especially preferred form of the invention, the cosolvent system comprises about 25 mole percent ethyl acetate and about 75 percent cyclohexane.

The process produces a pumpable slurry from which the desired copolymer can be recovered as a uniform, fine white powder having substantially no residual maleic anhydride.

DETAILED DESCRIPTION OF THE INVENTION

The novel slurry polymerization process of the present invention provides uniform, fine white copolymer powders of maleic anhydride and acrylic acid or methacrylic acid from the copolymerization of predetermined amounts of maleic anhydride and acrylic acid or methacrylic acid in a cosolvent system comprising ethyl acetate and an aliphatic or cycloaliphatic hydrocarbon. The copolymer powders of the invention are particularly useful in denture adhesive compositions.

In the process of the invention, from about 10 to 70 mole percent, preferably 20 to 60 mole percent, of maleic anhydride, and 30 to 90 mole percent, preferably 20 to 80 mole percent by weight, of acrylic acid or methacrylic acid, optionally, with up to about 25 mole percent of a $C_1$–$C_4$ alkyl vinyl ether, preferably methyl vinyl ether, is copolymerized in the cosolvent system of the invention, in the presence of a polymerization initiator, under suitable temperatures and reaction time conditions.

The sequence of addition of these monomers further assures that the polymerization mixture remains in a slurry form in the cosolvent system of the invention at all times during the reaction.

The cosolvent system of the invention comprises about 5 to 80 percent by weight of ethyl acetate and about 20 to 95 percent by weight of an aliphatic or cycloaliphatic hydrocarbon having a boiling point of at least 10° C. above the reaction temperature. Suitable aliphatic and cycloaliphatic hydrocarbons for use herein include hexane, heptane, octane, cyclohexane and the like. Cyclohexane is preferred. Most preferably the cosolvent system of the invention comprises about 10 to 75 percent by weight of ethyl acetate and about 25 to 90 percent by weight of the aliphatic or cycloaliphatic hydrocarbon. Most preferably, the cosolvent system comprises about 25 percent by weight of ethyl acetate and about 75 percent by weight of cyclohexane.

The cosolvent system of the invention has a synergistic effect on the polymerization as compared to each solvent alone. Particularly, ethyl acetate itself is unsuitable solvent for the polymerization because the copolymer is soluble in this solvent. Furthermore, the molecular weight of the copolymer produced in ethyl acetate is very low, and semi-solids product is produced. Similarly, cyclohexane alone is unsuitable because it produces insoluble precipitates which are not readily pumpable. Furthermore, polymer powders isolated from cyclohexane are nonuniform and contains aggregated particles. In contrast, a cosolvent system of ethyl acetate and cyclohexane provides a pumpable slurry of the copolymer without requiring excessive agitation or a protective colloid. In addition, this cosolvent system can remove any trace of residual maleic anhydride monomer from the copolymer product.

The use of predetermined ratios of each solvent in the cosolvent will provide copolymers having varying molecular weights. Consequently, the amount of ethyl acetate included in the cosolvent system of the invention must be carefully controlled because ethyl acetate has the effect of reducing the molecular weight of the copolymer and of solubilizing the copolymer. For example, the use of 66 percent by weight ethyl acetate in the cosolvent system will produce a polymer having a weight average molecular weight of about 30,000, while the use of 10 percent by weight ethyl acetate will produce a copolymer with a weight average molecular weight of about 400,000, under similar reaction conditions.

A cosolvent system comprising ethyl acetate and cyclohexane is particularly advantageous because their boiling points are very close (76° C. and 80° C., respectively), which enables the cosolvent system to be recycled easily by distillation. Mixtures of solvents with boiling points far apart are not favored because they would become enriched in the lower boiling solvent upon recycle distillation.

The boiling points of the solvents used herein usually are at least 10°, and preferably 20° or more, above the operating polymerization temperature, (preferably about 65° C.). This difference helps to moderate the effect of the exothermic polymerization reaction upon the solvent and obviates the need for a pressurized reactor.

The total monomer content in the cosolvent system of the invention usually is about 10 to 30 percent by weight, preferably about 20 to 25 percent by weight. In this concentration, the slurry remains pumpable under ordinary agitation of reactants at a reaction temperature between about 50° to 150° C.

The polymerization initiator for the process herein preferably is selected from peroxy esters, such as t-butylperoxy pivalate or t-amylperoxy pivalate, or dialkyl peroxides, such as di-decanoyl peroxide, although other initiators known in the art for free radical polymerization may be used as well.

In operation of the polymerization process of the invention, a solution comprising maleic anhydride reactant, initiator and cosolvent is precharged in a suitable reactor, and acrylic acid or methacrylic acid is fed continuously into the precharged solution, which is maintained at about 60° to 80° C., over a period of about 0.3 to 10 hours. The optional alkyl vinyl ether monomer is added after the acrylic acid reactant has been added. The polymerization mixture then is held at the reaction temperatures for an additional 15 to 90 minutes following completion of addition of all monomers. Several initiator boosters can be introduced during or after feeding of comonomers.

The invention will now be described with reference to the following specific working examples.

EXAMPLE 1

COPOLYMERIZATION OF ACRYLIC ACID AND MALEIC ANHYDRIDE IN ETHYL ACETATE-CYCLOHEXANE COSOLVENT

A 1-liter resin kettle was equipped with a stirrer, reflux condenser, $N_2$ inlet tube and an inlet closed with a rubber septum for introduction of initiator. The kettle was charged with 49.0 g. (0.50 mole) of maleic anhydride (MA), 275 g. (75 wt. %) of ethyl acetate (EA) and 92 g. (25 wt. %) of cyclohexane (CH). Agitation of the mixture was begun and the system was purged by bubbling in $N_2$ for 30 minutes, during which time maleic anhydride dissolved completely. The reaction mixture was then warmed to 65° C. and 0.3 ml of Lupersol 11 (Pennwalt) was injected through the septum to initiate polymerization. Simultaneously, dropwise addition of 73.0 g. (1.0 mole) of acrylic acid (AA) was begun and continued over a period of 3 hours. Lupersol 11 was added at a rate of 0.3 ml of initiator for each 30 minutes of AA addition during this period. After completion of all additions, the resulting mixture was maintained at 65° C. for 2 hours.

After 15 minutes the reaction mixture became whitish, and, thereafter, a uniformly thick, creamy slurry was formed which was pumped out of the kettle into a filtration unit. There the slurry was filtered and the polymer product was dried for about 12 hours at 65° C. in a forced air oven. The polymer product was a uniform, fine white powder, having a weight average molecular weight (as determined by GPC) of about 47,000. A sample of 1 g. of the polymer dissolved in 5 ml acetone was treated with triphenyl phosphine and it indicated that the conversion of maleic anhydride into polymer was complete.

EXAMPLES 2-10

The procedure of Example 1 was followed to provide copolymers of varying compositions and molecular weights. The results of Examples 1-10 are shown in Table 1 below. In Examples 9 and 10 therein, a third monomer, either butyl vinyl ether or methyl vinyl ether, was introduced after addition of acrylic acid was completed.

TABLE 1

| Ex. No. | Monomers AA (mole %) | MA | Other | Solvent EA (wt %) | CH | Initiator** (% by wt) | Temp. (°C.) | Weight Average Molecular Wt, Mw (× 10³) |
| --- | --- | --- | --- | --- | --- | --- | --- | --- |
| 1 | 66 | 33 | — | 75 | 25 | L-11; 0.3 | 65 | 47 |
| 2 | 66 | 33 | — | 25 | 75 | L-11; 0.4 | 65 | 145 |
| 3 | 50 | 50 | — | 25 | 75 | L-11; 0.4 | 65 | 79 |
| 4 | 57 | 43 | — | 50 | 50 | L-11; 3.2 | 65 | 19 |
| 5 | 57 | 43 | — | 25 | 75 | L-11; 0.8 | 65 | 59 |
| 6 | 57 | 43 | — | 25 | 75 | Dec-F; 0.4 | 75 | 202 |
| 7 | 57 | 43 | — | 25 | 75 | L-PMS; 0.4 | 75 | 110 |
| 8 | 80 | 20 | — BVE* | 10 | 90 | L-11; 0.25 | 65 | 310 |
| 9 | 45 | 33 | 22 MVE* | 50 | 50 | L-11; 3.2 | 65 | 16 |
| 10 | 67 | 17 | 16 | 10 | 90 | L-11; 0.4 | 60 | 337 |

*BVE - butyl vinyl ether;
*MVE - methyl vinyl ether
**L-11 - t-butyl perpivalate, L-PMS - t-butyl peroctoate, Dec-F - decanoyl peroxide

COMPARATIVE EXAMPLES 11-15

The procedure of Example 1 was followed using different solvents. The following results were obtained and are shown in Table 2 below. It is seen therein that single solvents, including ethyl acetate, cyclohexane, toluene, t-methyl butyl ether and xylene, produced nonuniform slurries and polymer powders, which were difficult to process and much less advantageous products than those made in the cosolvent system of the present invention.

TABLE 2

| Ex. No. | Monomers AA (mole %) | MA | Solvent | Initiator | Temp. (°C.) | Appearance of Slurry | Polymer |
| --- | --- | --- | --- | --- | --- | --- | --- |
| 11 | 80 | 20 | Toluene | L-11, 0.34 | 60 | Nonuniform; polymer settles and sticks to stirrer | Hard, granular powder |
| 12 | 80 | 20 | Methyl-t-butyl ether | L-11, 0.25 | 55 | As above | Uneven, fine powder, with hard pieces |
| 13 | 66 | 33 | Cyclohexane | L-11, 0.20 | 60 | As above | As above |
| 14 | 57 | 43 | Ethyl acetate | L-11, 3.2 | 65 | Dark red solution and a sticky semi-solid | |
| 15 | 13 | 87 | Xylene | L-11, 2.1 | 100 | Red soln. and semisolid | Red glass, very hard |

While the invention has been described with particular reference to certain embodiments thereof, it will be understood that changes and modifications may be made which are within the skill of the art. Accordingly, it is intended to be limited by the appended claims only, in which:

What is claimed is:

1. A slurry polymerization process for preparing uncrosslinked copolymers of maleic anhydride and acrylic acid or methacrylic acid, optionally including a $C_1$-$C_4$ alkyl vinyl ether, having a predetermined weight average molecular weight of about 10,000 to one million which comprises:

copolymerizing about 20 to 60 mole percent of maleic anhydride, about 40 to 80 mole percent of acrylic acid or methacrylic acid, and from 0 to 25 mole percent of a $C_1$-$C_4$ alkyl vinyl ether, in the presence of a free radical initiator, at about 60° to 80° C., in a cosolvent system comprising about 10 to 75 percent by weight of ethyl acetate and about 25 to 90 percent by weight of an aliphatic or cycloaliphatic hydrocarbon having a boiling point at least 10° C. above the reaction temperature, without the presence of a protective colloid, to produce a pumpable slurry of said copolymer in said cosolvent system, pumping the slurry from the reactor, and recovering the copolymer therefrom as a uniform, fine powder having substantially no residual maleic anhydride.

2. A slurry polymerization process according to claim 2 wherein said hydrocarbon is cyclohexane.

3. A slurry polymerization process according to claim 2 wherein said cosolvent system comprises about 25 percent by weight of ethyl acetate and about 75 percent by weight of cyclohexane.

4. A slurry polymerization process according to claim 1 wherein said copolymer product has a weight average molecular weight of about 30,000 to 400,000.

5. A slurry polymerization process according to claim 1 wherein a solution of maleic anhydride and initiator in the cosolvent is precharged into a reactor and acrylic acid or methacrylic acid is slowly added to the precharged solution.

6. A slurry polymerization process according to claim 5 wherein said alkyl vinyl ether monomer is fed into the reactor after addition of acrylic acid or methacrylic acid and at least about 80% of the maleic anhydride monomer has reacted.

7. A slurry polymerization process according to claim 1 wherein the total monomer content in said co-solvent system is about 10 to 35 percent by weight of the solution.

8. A slurry polymerization process according to claim 7 wherein the total monomer content in said co-solvent system is about 20 to 25 percent by weight.

9. A slurry polymerization process according to claim 4 wherein the copolymer powders are recovered after pumping the slurry from the reactor by drying the slurry to form the desired fine powder copolymer product.

10. A slurry polymerization process according to claim 4 wherein the copolymer powders are obtained by pumping the slurry from the reactor, filtering and drying.

* * * * *

UNITED STATES PATENT OFFICE
CERTIFICATE OF CORRECTION

Patent No. 5,008,355           Dated April 16, 1991

Inventor(s) MOHAMMED TAZI, KRYSTYNA PLOCHOCKA AND ROBERT B. LOGIN

It is certified that error appears in the above-identified patent and that said Letters Patent is hereby corrected as shown below:

Title Page:

The inventors listed in [75] following the Title [54] should read : MOHAMMED TAZI, Wayne; KRYSTYNA PLOCHOCKA, Scotch Plains, ROBERT B. LOGIN, Oakland, all of N.J.

Signed and Sealed this

Twenty-fifth Day of August, 1992

Attest:

DOUGLAS B. COMER

Attesting Officer       Acting Commissioner of Patents and Trademarks